US009917752B1

(12) United States Patent
Ram et al.

(10) Patent No.: US 9,917,752 B1
(45) Date of Patent: *Mar. 13, 2018

(54) OPTIMIZATION OF CONTENTION PARAMATERS FOR QUALITY OF SERVICE OF VOIP (VOICE OVER INTERNET PROTOCOL) CALLS IN A WIRELESS COMMUNICATION NETWORK

(75) Inventors: Mohan Ram, Bangalore (IN); Vaduvur Bharghavan, Morgan Hill, CA (US)

(73) Assignee: Fortinet, LLC, Sunnyvale, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 13/168,528

(22) Filed: Jun. 24, 2011

(51) Int. Cl.
*H04L 12/26* (2006.01)
*H04L 29/06* (2006.01)
*H04W 24/10* (2009.01)
*H04W 24/02* (2009.01)

(52) U.S. Cl.
CPC ............ *H04L 43/08* (2013.01); *H04L 65/80* (2013.01); *H04W 24/02* (2013.01); *H04W 24/10* (2013.01)

(58) Field of Classification Search
USPC ....... 370/338, 252, 352, 255, 310, 445, 345, 370/235, 256
See application file for complete search history.

(56) References Cited

U.S. PATENT DOCUMENTS

| 6,760,318 | B1 | 7/2004 | Bims |
| 6,788,658 | B1 | 9/2004 | Bims |
| 6,839,038 | B2 | 1/2005 | Weinstein |
| 6,894,649 | B2 | 5/2005 | Ostervall |
| 6,954,177 | B2 | 10/2005 | Channabassapa et al. |
| 7,684,333 | B1 * | 3/2010 | Dasylva ............... H04L 5/0037 370/235.1 |
| 2002/0110085 | A1 | 8/2002 | Ho et al. |
| 2004/0105434 | A1 | 6/2004 | Baw |
| 2006/0007914 | A1 | 1/2006 | Chandra et al. |

(Continued)

FOREIGN PATENT DOCUMENTS

| JP | 2005311580 | 11/2005 |
| JP | 2006229972 | 8/2006 |

OTHER PUBLICATIONS

Habib et al. "Multi-antenna techniques for OFDM based WLAN." Proceedings of First International Conference on Next-Generation Wireless Systems, Jan. 2006, pp. 186-190.

(Continued)

*Primary Examiner* — Khaled Kassim
(74) *Attorney, Agent, or Firm* — Law Office of Dorian Cartwright; Dorian Cartwright

(57) ABSTRACT

A system and method for optimizing voice communications in a wireless network including an AP having a message waiting time that provides proper QoS while losing minimal communication bandwidth. The QoS may be responsive to the amount of user traffic in both the AP and neighboring APs. The method may include setting parameters for each level of QoS in response to a measure of the degree of contention for that level of QoS, and in response to a measure of the degree of contention for those levels of QoS with higher priority, and setting waiting time parameters in response to a stochastic model of contention at each level of QoS. Operational parameters might include contention window time, AIFS time, and back-off value(s), and might be modified in response to message QoS.

10 Claims, 3 Drawing Sheets

(56) References Cited

U.S. PATENT DOCUMENTS

| | | | |
|---|---|---|---|
| 2006/0104232 A1* | 5/2006 | Gidwani | H04W 28/18 370/328 |
| 2007/0091805 A1* | 4/2007 | Ramprashad et al. | 370/230.1 |
| 2007/0147317 A1* | 6/2007 | Smith | H04W 48/18 370/338 |
| 2007/0165610 A1 | 7/2007 | Tseng et al. | |
| 2007/0171823 A1* | 7/2007 | Hunt | H04L 12/5695 370/232 |
| 2007/0238438 A1* | 10/2007 | Alon | H04W 52/0225 455/343.2 |
| 2008/0014956 A1* | 1/2008 | Balasubramanian | H04L 41/0806 455/452.1 |
| 2008/0049615 A1* | 2/2008 | Bugenhagen | H04L 47/22 370/230.1 |
| 2008/0080414 A1* | 4/2008 | Thubert et al. | 370/328 |
| 2008/0253314 A1* | 10/2008 | Stephenson | H04W 24/08 370/326 |
| 2008/0261602 A1 | 10/2008 | Livneh | |
| 2009/0122711 A1 | 5/2009 | Soomro | |
| 2009/0154436 A1* | 6/2009 | Choi | H04W 72/1242 370/338 |
| 2009/0257405 A1* | 10/2009 | Stamoulis | H04W 72/085 370/332 |
| 2010/0034170 A1* | 2/2010 | Hirano | H04L 47/283 370/331 |
| 2010/0182929 A1* | 7/2010 | Abraham et al. | 370/252 |
| 2011/0038334 A1* | 2/2011 | Huang | H04W 72/04 370/329 |
| 2011/0075613 A1* | 3/2011 | Yuan | 370/329 |
| 2013/0010655 A1 | 1/2013 | Ho | |
| 2013/0034076 A1* | 2/2013 | Ketchum | H04W 72/12 370/329 |

OTHER PUBLICATIONS

Kitahara et al. "A base station adaptive antenna for downlink transmission in a OS-COMA system." IEEE 51 st Vehicular Technology Conference Proceedings, 2000 (abstract).

Mahler et al. "Design and optimisation of an antenna array for WiMAX base stations." IEEE/ACES International Conference on Wireless Communications and Applied Computational Electromagnetics, 2005 (abstract).

Miaris et al. "On the base stations antenna system design for mobile communications." Electrical Engineering, 2006, vol. 88, pp. 157-163.

Miura et al. "Study of array pattern tuning method using hybrid genetic algorithms for figure-8 satellite's earth station antenna." Asia-Pacific Microwave Conference Proceedings, 2000 (abstract).

Ponnapalli et al. "Design and packaging of antennas for wireless systems." Proceedings of Electrical Performance of Electrical Packaging, 1995 (abstract).

Sarolic. "Base station antenna near-field radiation pattern distortion analysis." Transactions on Engineering Sciences, 2003, pp. 1-10, vol. 41, WIT Press.

\* cited by examiner

OPTIMIZATION OF CONTENTION PARAMATERS FOR QUALITY OF SERVICE OF VOIP (VOICE OVER INTERNET PROTOCOL) CALLS IN A WIRELESS COMMUNICATION NETWORK

INCORPORATED DISCLOSURES

This application claims priority of the following disclosures. Each of these documents is hereby incorporated by reference as if fully set forth herein. Each document incorporated in any of these documents is also hereby incorporated by reference as if fully set forth herein.

These disclosures are sometimes referred to herein as the "Incorporated Disclosures".

U.S. patent application Ser. No. 11/298,864, filed Dec. 9, 2005, in the name of Vaduvur BHARGHAVAN, Sung-Wook HAN, Joseph EPSTEIN, Berend DUNSBERGEN, and Saravanan BALASUBRAMANIAN, titled "Seamless Mobility in Wireless Networks", and assigned to the same assignee;

U.S. patent application Ser. No. 11/298,864, filed Dec. 9, 2005, in the name of Vaduvur BHARGHAVAN, Sung-Wook HAN, Joseph EPSTEIN, Berend DUNSBERGEN, and Saravanan BALASUBRAMANIAN, titled "Seamless Mobility in Wireless Networks", and assigned to the same assignee;

U.S. patent application Ser. No. 11/294,673, filed Dec. 5, 2005, in the name of Rajendran VENUGOPALACHARY, Senthil PALANISAMY, Srinith SARANG, and Vaduvur BHARGHAVAN, titled "Omni-Directional Antenna Supporting Simultaneous Transmission and Reception of Multiple Radios with Narrow Frequency Separation", and assigned to the same assignee;

U.S. Provisional Patent Application Ser. No. 61/095,578, filed Sep. 9, 2008, in the name of inventors Vaduvur BHARGHAVAN and Berend DUNSBERGEN, titled "Seamless Roaming in Wireless Networks", and assigned to the same assignee; and U.S. application Ser. No. 12/976,717, filed Dec. 22, 2010, titled "Optimizing Quality of Service in Wireless Networks".

Inventions described herein might be used in combination or conjunction, or otherwise, with technologies described in the Incorporated Disclosures.

The invention is not in any way limited to the specifics of any particular examples disclosed herein. Many other variations are possible which remain within the content, scope and spirit of the invention, and these variations would become clear to those skilled in the art after perusal of this application.

BACKGROUND

Wireless devices provide for various communication modes such as voice, video, data, and possibly otherwise. The operation of the communications network determines how well these modes function. Certain modes suffer more than others from network problems such as latency and missing data. For a $1^{st}$ example and without limitation, voice communication over a network might become degraded if the network operates slowly enough that one user can hear a time delay while talking to another. For a $2^{nd}$ example and without limitation, with digital communication of documents, latency might not be of particularly strong importance, but data communication is considered degraded if any data goes missing. In wireless communication systems, problems can be more acute when wireless stations transition between different access points, or when they are subject to one or more forms of interference. Interference might include natural signal losses when moving away from an access point, interference from access points operating on the same frequency, and other forms.

Messages sent in networks often have a QoS (quality of service) associated with them. In current use on the Internet, there are typically at least 4 classes of QoS: VO (voice), VI (video), BE (best efforts), and BK (background), from highest priority to lowest priority. Routing standards often provide that each AP (access point) waits an amount of time after the communication channel becomes clear, then begins transmitting if the communication channel has not already been seized by another AP. Determining an optimal amount of time to wait so as to provide proper QoS, while losing minimal bandwidth to unnecessary waiting, might involve selecting as many as 32 separate parameters for each AP (4 classes of QoS times 4 parameters, times 2 because uplink and downlink parameters might be different). Each level of QoS has a distinct set of characteristics associated with traffic usually associated with that QoS.

One known problem is that two distinct classes of messages, each with a distinct QoS, might interfere with each other and cause degradation of one or both. For example and without limitation, as noted above, voice messages generally presuppose low latency, while data messages generally presuppose low bit error rates. Known methods of approaching this problem include separating each distinct class of messages, each associated with a distinct QoS, into a separate queue for reception or transmission. While this method generally has the feature of separate treatment of distinct classes of messages, it has the drawback that a $1^{st}$ class of messages (e.g., voice) might be subject to degradation due to a prevalence of a $2^{nd}$ class of messages (e.g., data), as the latter type of messages might be significantly longer, and thus take more time even if assigned relatively lower priority.

SUMMARY OF THE DESCRIPTION

We provide techniques for VOIP (voice over IP) communication in a wireless communication system, including causing each AP (access point) to induce a substantially optimal communication delay, with the effect of providing proper QoS for voice messages while losing only minimal communication bandwidth. These techniques might include identifying a number of VOIP calls being conducted, both at a particular active AP and at those AP's within near communication range, and setting a set of contention window parameters relating to AP requests for communication bandwidth.

In general, contention window parameters (such as for example AIFS time, minimum contention window, and maximum contention window) for higher-priority traffic use relatively lower parameter values, with the effect of providing better QoS to that higher-priority traffic. We provide contention window parameters that are responsive to a number of VOIP calls at both the active AP and at any AP's within near communication range. This has the effect of reducing a relative number of collisions, back-offs, and retries, reducing packet loss and communication delay, even when the possibility of VOIP call traffic contention is due, not to contention at the active AP, but to contention with AP's within near communication range. This in turn has the effect of allowing a relatively higher number of VOIP calls with acceptable voice quality.

We also provide contention window parameters that are responsive to a number of best-effort traffic requests (and to a number of VOIP call requests) at both the active AP and at any AP's within near communication range. This has the effect of reducing a relative number of collisions, back-offs, and retries, reducing packet loss and communication delay, even when the possibility of best-effort traffic contention (both best-effort traffic contention with other best-effort traffic contention, and best-effort traffic contention with VOIP calls) is due, not to contention at the active AP, but to contention with AP's within near communication range. This in turn has the effect of allowing a relatively higher number of best-effort traffic requests with acceptable QoS.

We also provide contention window parameters that are responsive to stochastic modes of contention, such as for example distinct models of contention for differing classes of traffic or sets of messages. For example and without limitation, distinct models of contention might exist for differing QoS parameters or for differing types of network communication node. For example and without limitation, in cases in which messages are received at a node in a wireless communication network, such as for example an AP, a similar node, or other type of node, those messages might be assigned contention window parameters in response to either the type of message, the type of node, some combination or conjunction thereof, or otherwise. In one embodiment, AP's might use a $1^{st}$ contention model, while non-AP's might use one or more models distinct from that $1^{st}$ contention model.

In one embodiment, one or more control elements associated with the wireless communication system might direct or provide for coordination between or among multiple AP's and other devices, with the effect of substantially improving or optimizing contention models and parameters therefor.

DESCRIPTION

Generality of the References

Figure 1:
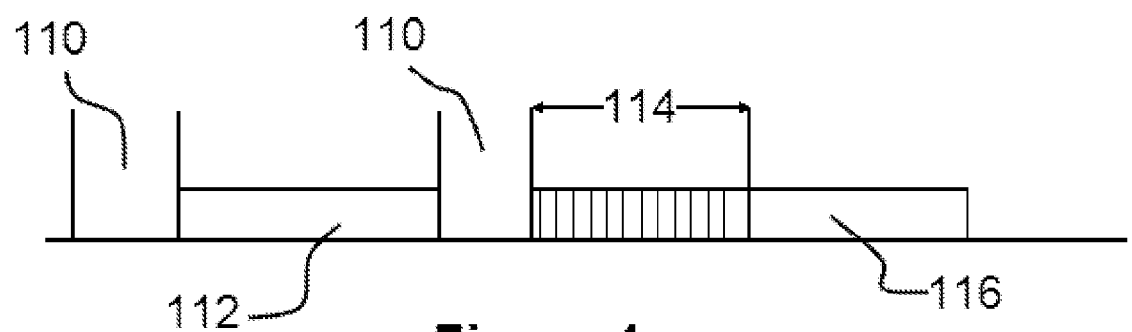
FIG. 1 shows a conceptual diagram of timing in a communication system.

This application should be read in the most general possible form. This includes, without limitation, the following:

References to contemplated causes and effects for some implementations do not preclude other causes or effects that might occur in other implementations.

References to one embodiment or to particular embodiments do not preclude alternative embodiments or other embodiments, even if completely contrary, where circumstances would indicate that such alternative embodiments or other embodiments would also be workable.

References to particular hardware or software should be read as also applicable to software (instead of hardware), or hardware (instead of software) or to some combination or conjunction thereof, whether of a similar nature or otherwise.

References to particular reasons or to particular techniques do not preclude other reasons or techniques, even if completely contrary, where circumstances would indicate that the stated reasons or techniques are not as applicable.

References to "preferred" techniques generally mean that the inventors contemplate using those techniques, and think they are best for the intended application. This does not exclude other techniques for the invention, and does not mean that those techniques are necessarily essential or would be preferred in all circumstances.

References to specific techniques include alternative and more general techniques, especially when discussing aspects of the invention, or how the invention might be made or used.

Generality of the Techniques

Technologies shown or suggested by this description should also be thought of in their most general possible form. This includes, without limitation, the following:

The phrases and terms "causing", "directing", "instructing", "to cause", "to direct", "to instruct" (and similar phrases and terms) generally indicates any technique in which one or more $1^{st}$ devices or methods induce one or more $2^{nd}$ devices or methods to take action, whether or not that action is assured (for example and without limitation, including a message, a posted change to a data structure, or otherwise).

The phrases and terms "constantly", "continually", "from time to time", "occasionally", "periodically" (and similar phrases and terms) generally indicate any case in which a method or technique, or an apparatus or system, operates over a duration of time, including without limitation any case in which that operation occurs only part of that duration of time. For example and without limitation, these terms would include, without limitation, methods which perform an operation as frequently as feasible, on a periodic schedule such as once per second or once per day, in response to an alarm or trigger such as a value reaching a threshold, in response to a request or an implication of a request, in response to operator intervention, otherwise, and to combinations and conjunctions thereof.

The phrases and terms "distribute", "to distribute" (and similar phrases and terms) generally indicate any case in which one or more $1^{st}$ devices or methods, induce information (for example but without limitation, data or instructions) to appear at one or more $2^{nd}$ devices or methods, whether or not that information is assured to appear thereat (for example and without limitation, including a message, a posted change to a data structure, or otherwise).

The phrases and terms "effect", "with the effect of" (and similar phrases and terms) generally indicate any natural and probable consequence, whether or not assured, of a stated arrangement, cause, method, or technique, without any implication that an effect or a connection between cause and effect are intentional or purposive.

The phrases and terms "data", "information" (and similar phrases and terms) generally indicate any form of bits/digits or values (whether analog, digital, or otherwise), collection or content, coincidence or correlation (whether causal or otherwise), evidence or logical tendency (whether probabilistic, pseudo-probabilistic or otherwise), or other indication of any kind from which a computing device might be able to draw conclusions.

The term "instruction" (and similar phrases and terms) generally indicates any information or other arrangement or disposal or matter or energy, having the property of being interpretable by a computing device, or other device, to perform operations (possibly conditional operations, parallel operations, pipelined operations, or other dispositions of method steps or operations as might be known or developed in the many fields of computing science), whether or not responsive to inputs, states or state-changes, or other instructions, from any source whatever, or otherwise, or combinations or conjunctions thereof.

The phrases and terms "methods, physical articles, and systems", "techniques" (and similar phrases and terms) generally indicate any material suitable for description, including without limitation all such material within the scope of patentable subject matter, or having ever been considered within the scope of patentable subject matter, or which might colorably be within the scope of patentable subject matter, notwithstanding most recent precedent.

The phrase "on its own initiative" (and similar phrases and terms) generally indicates that one or more devices or methods operate without instruction from an external source. For example and without limitation, a $1^{st}$ device might operate "on its own initiative" if it acts responsive to data or instructions at that $1^{st}$ device, or responsive to data or instructions accessible by that $1^{st}$ device, or otherwise without being explicitly directed by a $2^{nd}$ device.

The phrases and terms "pseudo-random", "random" (and similar phrases and terms) generally indicate any technique of any kind, in which information is generated or selected in a manner not predictable to the recipient. In the context of the invention, data, information, numbers, processes, or otherwise, referred to herein as "random", need not be equidistributed (or have any other particular distribution) over anything in particular, and might in general be pseudo-random in addition to, or in lieu of, being random.

The term "relatively" (and similar phrases and terms) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "substantially" (and similar phrases and terms) generally indicates any case or circumstance in which a determination, measure, value, or otherwise, is equal, equivalent, nearly equal, nearly equivalent, or approximately, what the measure or value is recited. The terms "substantially all" and "substantially none" (and similar phrases and terms) generally indicate any case or circumstance in which all but a relatively minor amount or number (for "substantially all") or none but a relatively minor amount or number (for "substantially none") have the stated property. The terms "substantial effect" (and similar phrases and terms) generally indicate any case or circumstance in which an effect might be detected or determined.

The phrases "this application", "this description" (and similar phrases and terms) generally indicate any material shown or suggested by any portions of this application, individually or collectively, including all documents incorporated by reference or to which a claim of priority can be made or is made, and include all reasonable conclusions that might be drawn by those skilled in the art when this application is reviewed, even if those conclusions would not have been apparent at the time this application is originally filed.

The invention is not in any way limited to the specifics of any particular examples disclosed herein. After reading this application, many other variations are possible which remain within the content, scope and spirit of the invention; these variations would be clear to those skilled in the art, without undue experiment or new invention.

Real-World Nature

We provide techniques, including methods, physical articles, and systems, that receive real-world information dictated by real-world conditions (not mere inputs to a problem-solving technique). The provided techniques are transformative of the information received, at least in the senses that incoming data is reordered and allocated to particular times and priorities. This has the effect that a $1^{st}$ type of information (e.g., incoming message units) is transformed into a $2^{nd}$ type of information (e.g., relative priority of outgoing message units).

We also provide techniques that are tied to a particular machine, at least in the sense that allocation of time and bandwidth is performed in a communication system. While this description is primarily directed to that portion of the invention in which an AP plays a prominent role, this description also shows that an AP alone (i.e., without appropriate instructions) be sufficient to perform methods, or comprise systems, within the scope and spirit of the invention.

This description includes a preferred embodiment with preferred process steps and data structures. After reading this application, those skilled in the art would recognize that embodiments of the invention can be implemented using general purpose computing devices or switching processors, special purpose computing devices or switching processors, other circuits adapted to particular process steps and data structures described herein, or combinations or conjunctions thereof, and that implementation of the process steps and data structures described herein would not require undue experimentation or further invention.

Definitions and Notations

The following definitions are exemplary, and not intended to be limiting in any way:

The phrases "access point," the term "AP," (and similar phrases and terms) generally refer to devices capable of wireless communication with wireless devices and capable of either wired or wireless communication with other devices. In preferred embodiments, AP's communicate with external devices using a L2/L3 network. However, in the context of the invention, there is no particular requirement that AP's have an actual wired communication link; AP's might communicate entirely wirelessly.

The phrase "communication bandwidth," (and similar phrases and terms) generally indicate any data or information, method or technique, or other aspect of a system, relating to amount, fraction, or other measure, of communication resources available to, assigned to, or otherwise measured with respect to, communication.

The phrase "contention window parameters" (and similar phrases and terms) generally indicates any data or information, method or technique, or other aspect of a system, relating to assignment of communication resources to one or more of multiple requests or requestors for such resources.

The terms "higher-priority," "lower-priority," "priority" (and similar phrases and terms) generally indicate any data or information, method or technique, or aspect of a system, relating to whether one request or requestor, or class of traffic, element of traffic, or message, is given preference. For example and without limitation, such phrases and terms are applicable even in cases in which preference is responsive at least in part to a random or pseudo-random factor, or other factors.

The phrases "incoming message", "message packet", "received frame" (and similar phrases and terms) generally refer to one or more message units (for example and without limitation, a message packet or message frame) sent by a wireless device or wireless station to an AP. For example and without limitation, these phrases might refer to a (multicast or unicast) frame sent by a wireless station to an AP using an IEEE 802.11 wireless communication standard.

The phrase "message unit" (and similar phrases and terms) generally indicates any individually or separately transmittable portion of a message, including without limitation, a data flow, a message frame, a message packet, or otherwise. For example and without limitation, a message unit might include an IEEE 802.11 standard message frame, but in the context of the invention, there is no particular reason for any such limitation.

The term "latency" (and similar phrases and terms) generally refers to a time interval between when a network station seeks access to a transmission channel and when access is granted or received. Latency may also refer or relate, in cases with respect to a bridge or router, as an amount of time elapsed between receiving and retransmitting a message packet.

The phrases "mobile station," "wireless device," "wireless station," (and similar phrases and terms) generally refer to any device or elements capable of wireless communication with AP's. For example and without limitation, wireless devices might perform according to a wireless communication standard such as an IEEE 802.11 standard, or a variant thereof. However, in the context of the invention, there is no particular requirement (1) that this particular communication standard is used, e.g., the wireless communication might be conducted other than according to 802.11, or even other than according to any IEEE standard entirely, or (2) that all wireless devices each use the same standard or even use inter-compatible communication standards.

The phrases "outgoing message," "transmit frame," (and similar phrases and terms) generally refer to one or more message units (for example and without limitation, one or more message packets or message frames) to be sent to a wireless device, wireless station, or other element, such as from one or more AP's. For example and without limitation, these phrases might refer to one or more (multicast or unicast) frames sent by an access point to a wireless device according to an IEEE 802.11 wireless communication standard.

The phrases "QoS," "quality of service," (and similar phrases and terms) generally refer to one or more measures of service, such as deliverable or delivered to a network user, possibly collectively determined over a set of messages or message units. In one embodiment, QoS may be characterized by one or more performance criteria, including but not limited to availability (such as for example, relatively lower downtime), error performance, response time, throughput, or lost calls or lost transmissions, such as possibly in response to network congestion.

The term "VOIP" (and similar phrases and terms) generally indicate voice over IP, or any similar protocol or technique, or any related method or technique having related or similar functions.

The phrase "wireless communication," (and similar phrases and terms) generally refer to any form of communication not requiring any physical matter coupling of substantial duration, such as for example, radio frequency or other electromagnetic communication. For example and without limitation, these phrases might refer to use of an IEEE 802.11 standard, or a variant thereof. However, in the context of the invention, there is no particular requirement that wireless communication or a communication network must necessarily (1) use radio spectrum, (2) use electromagnetic communication, or even (3) be entirely confined to untethered communication.

After reading this application, those skilled in the art would recognize that these definitions would be applicable to techniques, methods, physical elements, software elements, combinations or conjunctions of physical elements and software elements, and systems—not currently known, or not currently known to be applicable by the techniques described herein—including extensions thereof that would be inferred by those skilled in the art after reading this application, even if not obvious to those of ordinary skill in the art before reading this application.

FIGURES AND TEXT

Where described as shown in a figure, one or more elements might include
    other items shown in the figure in addition to, or operating in combination or conjunction with, those particular one or more elements (or that those particular one or more elements in combination or conjunction with one or more other elements, whether shown or not shown in the figure, and whether described or not described with respect to the figure);
    one or more other elements not shown in the figure, but whose inclusion would be known to those skilled in the art, or which would be known after reasonable investigation, without further invention or undue experimentation; and
    subparts of those one or more elements, whether shown or not shown in the figure, which might be convenient for operation of those one or more elements, but which are not necessarily required in the described context, or which might be necessary for operation of those one or more elements in the described context, but which are not necessary for description at a level understandable to those skilled in the art.

Where described or shown in a figure, apparatus elements might include
    physical devices having the properties described or carrying out the functions associated therewith; such physical devices might include electronic circuits or other physical devices, whether specially designed for those properties or functions, or whether more generally designed and where adapted or configured for those properties or functions;
    electronic or other circuitry operating under control of software elements, those software elements being embodied in a physical form for at least a duration of time, with the effect that the electronic or other circuitry has the properties or functions associated therewith when operating under control of those software elements;

software components having the properties described or carrying out the functions associated therewith; such software components might include information interpretable as instructions, associated with devices capable of performing those instructions, whether specially designed for those functions or instructions, or whether more generally designed and where adapted or configured for those functions or instructions.

Where described or shown in a figure, apparatus elements, including either physical elements or software components, might be coupled in a manner as shown in the figure, or where no specific coupling is shown, in a manner known to those skilled in the art (for example and without limitation, apparatus elements might be coupled mechanically, electronically, electromagnetically, or by one or more other techniques known to those skilled in the art, either in the alternative or in combination or conjunction, whether or not obvious at the time of this description, while software components might be coupled using any of the techniques known in the many fields of computer science, with or without assistance of additional software components, operating system elements, or by one or more other techniques known to those skilled in the art, either in the alternative or in combination or conjunction, whether or not obvious at the time of this description);

in a manner as described in text referring to the figure, or where no specific coupling is described, in a manner known to have the properties or functions associated therewith, in at least some contexts as contemplated by the inventors or as implied by the description;

in a manner other than as shown in the figure, or other than as described in the text, where the figure or text indicates that other such manners might be contemplated in the making or use of the invention, either in the alternative or in combination or conjunction, whether or not obvious at the time of this description;

in a manner other than as shown in the figure, or other than as described in the text, where adaptation or configuration thereof might be involved in the properties or functions associated therewith.

For example and without limitation, where a context for making or use of the invention might involve a distinct adaptation or configuration thereof, those apparatus elements or software components might be so adapted or so configured to have, or to substantially approximate, properties or functions as described herein, or as would be known to those skilled in the art.

Where described or shown in a figure, flow labels, method steps, and flow of control might include one or more physical devices operating in combination or conjunction to perform the operations described, with the properties or functions thereof;

one or more portions of a single device, or of a set of devices coupled or in communication, or otherwise operating in combination or conjunction thereof, to perform the operations described, with the properties or functions thereof;

one or more software components operating in combination or conjunction, or with the assistance of other known techniques known in the many fields of computer science, to perform the operations described, with or without assistance of additional software components, such as for example operating system elements, firmware elements, or related elements.

For example and without limitation, one or more software threads, processes, data structures, or other constructs known in the many fields of computing sciences and engineering, coupled or in communication, or otherwise operating in combination or conjunction thereof, to perform the operations described, with the properties or functions thereof.

Where described or shown in a figure, flow labels, method steps, and flow of control might include one or more parallel flows of control, operating concurrently or in cooperation, in parallel or in a pipelined manner, or otherwise as known in the many fields of computing sciences and engineering, with the effect that the flow labels, method steps, flows of control, or operations might be performed or traversed in one or more orderings, whether directly specified in the figures or text, or as indicated therein as alternatives, or as substantially having the same properties or functions, or otherwise having substantially the same effect.

For example and without limitation, in the context of the invention, there is no particular requirement for the flow labels, method steps, flow of control, or operations, to occur in the order they are coupled or otherwise shown in the figures, or in the order they are described in the text.

Where distinct or separate data elements are shown as being used or operated upon, those distinct or separate data elements might be substantially so used or substantially so operated upon in parallel, in a pipelined manner, or otherwise.

Where an individual data element is shown as being used or operated upon, it might occur that the individual data element is substantially replicated, at least in part, with the effect that the individual data element might be used by more than one method step, flow of control, or operation, concurrently or in parallel or otherwise, consistently (or inconsistently with a form of reconciliation) or otherwise.

For example and without limitation, in the context of the invention, there is no particular requirement for the flow labels, method steps, flow of control, or operations, to occur in the order they are coupled or otherwise shown in the figures, or in the order they are described in the text. Where described or shown in a figure, or in the text, machines, articles of manufacture, or compositions of matter (or of matter and energy), might be disposed for including or maintaining, whether relatively permanently or relatively evanescently, or otherwise, information.

Where such information is specified, either relatively generally or relatively in detail, such information might be included or maintained by any technique involving the use of matter, combinations or conjunctions of matter and energy, techniques derived from computing sciences or information sciences, or other techniques in which such information might be derived or interpretable by one or more computing devices, at a later time or distinct place, or at another event in space-time. Although this description focuses on techniques for encoding information presently known to those skilled in the art, or where no such techniques are described, on techniques known in the many fields of computing science or information science, in the context of the invention, there is no particular requirement therefore. For example and without limitation, any and all such techniques for including or maintaining information, retrievable at a later time or distinct place, or at another event in space-time, might be applicable, even if currently not obvious to those of ordinary skill in the art.

Where such information is specified, that information might be included or maintained by any one or more coding schemas, or other techniques for maintaining information against error, loss, inaccessibility, or other issues, which should be generally inferred by the reader when construing or interpreting techniques described herein. For example and without limitation, techniques such as use of data backup or recovery, data mirroring, parity information, redundant encoding, triple-modular or other redundancy, and other methods known in the many fields of computing science or information science, should generally be implied by this description whenever inclusion, maintenance, transmission, copying, or other treatments of information are involved.

Where such information is specified, that information might be contemplated to be included or maintained with the effect of retaining that information for use in another context, at another place or time, in another device or in a similar or identical device otherwise distinct, or embodied in a form suitable for carriage or copying from a $1^{st}$ place or time to a $2^{nd}$ place or time, such as on a device being at least in part electromagnetic, optical, physically configured, or making use of quantum-mechanical principles with respect to information.

Where such information is specified, that information might be segregated into individual portions, each representing whole number of bits, partial bits, probabilistic or conditionally probabilistic conditions from which information might be deduced, or otherwise. Although this description focuses on information-bearing articles which can be written, read, or transported in individual units, in the context of the invention, there is no particular requirement therefor.

For example and without limitation, information might be recorded, stored, or otherwise maintained on one or more physical elements or devices, with the information being separated either logically, physically, or holographically (the latter including the possibility that more than one such physical element or device might be involved in recovery or interpretation of the information).

For example and without limitation, in one embodiment, a system might include information with the property that any one individual device or even any one individual storage block is generally insufficient to allow a computing device to determine any one or more individual datum without reference to another device or storage block.

For example and without limitation, in one embodiment, an information-bearing element might include information that is encoded or encrypted with the property that any one individual device or even any one individual storage block is generally insufficient to allow a computing device to determine any one or more individual datum without reference to a decoding or decrypting key.

For example and without limitation, in one embodiment, an information-bearing element might include information that is accessible to a software component using a communication system, such as for example with the assistance of a coding system associated with a communication system, a communication protocol, an error-correcting code associated with an information-bearing element, a method or technique of associating or including data or information within a signal (such as for example a communication signal), or any one or more techniques known in the fields of computing science that might have the effect of allowing the recovery of information, either concurrently or at a later time.

Where such information is specified, that information might be interpretable by a computing device, or other data-processing device, as representing instructions to a device (including the possibility of a Turing-equivalent computing device operating under control of those instructions, either with or without additional instructions with the effect of providing additional functionality), as representing data to be compared, manipulated, reviewed, or otherwise processed by a device, as representing data describing a format of such data, such as for example a schema for a relational database, as representing metadata of some type, such as for example a measure of freshness or reliability of information, or otherwise, or combinations or conjunctions thereof.

For example and without limitation, in one embodiment, an information-bearing element might include information interpretable as hardware instructions, assembly-language instructions, compilable or interpretable higher-level language instructions, scripting instructions, or otherwise, or some combination or conjunction thereof.

For example and without limitation, in one embodiment, an information-bearing element might include information interpretable as a data encoding format, as a relational database schema or other database descriptor, as a data structure such as a tree structure, directed acyclic graph, heap storage, stack frame, or otherwise, or some combination or conjunction thereof.

For example and without limitation, in one embodiment, an information-bearing element might include data values to be compared, manipulated, reviewed, or otherwise processed by a device, such as for example a set of integers, floating-point numbers (for example, in an IEEE floating-point number standard format), data structures representing or indicative of other modelable elements, or otherwise, or some combination or conjunction thereof.

For example and without limitation, in one embodiment, an information-bearing element might include metadata of some type, such as for example a measure of freshness or reliability of information, a measure of precision or significance of figures, a measure of possible error, or otherwise, or combinations or conjunctions thereof.

Although this description is focused upon particular types of information as detailed herein, in the context of the invention, there is no particular requirement for any such limitation. For example and without limitation, there is no particular requirement that information or data need be represented in a digital format (an analog format might be a substitute), in a binary format (a format in a digital radix or other radix might be a substitute), in a time-division or space-division format (a format using a frequency-division or code-division format might be a substitute), or otherwise, or some combination or conjunction thereof.

FIG. 1

FIG. 1 shows a conceptual diagram of timing in a communication system.

In the figure, a horizontal coordinate generally indicates time, while a vertical coordinate generally indicates events that are scheduled for selected times. The figure shows an automatic inter-frame spacing (AIFS) time 110, a time when the communication medium is occupied 112, and a contention window time 114.

Example Contention Parameters

After each time when the communication medium is occupied 112, each node in a communication system waits at least a minimum AIFS time before attempting to transmit a message unit. The minimum AIFS time is responsive to the QoS associated with the message unit. Higher-priority message units (i.e., those for which lesser latency is desired) are assigned a relatively lower AIFS time. This has the effect that those higher-priority message units, if available to be sent after a time duration when the communication medium is occupied 112, will be sent first.

After the AIFS time is done, the communication medium is considered open for seizing by the first moving node in the communication system. During the contention time 114, each node selects a random amount of time to wait (for example and without limitation, a value between [0] and $[2^n]$, where [n] is a waiting-time parameter) before attempting to seize the communication medium. If two nodes have equal or similar waiting-time parameters, this has the effect that they will share the communication medium approximately equally. If a node A has a relatively smaller waiting-time parameter than a node B, this has the effect that node A will seize the communication medium relatively more frequently than node B, that is, with relatively higher priority. This technique is sometimes referred to as a DCF (distributed coordination function), or alternatively, as a stochastic model of contention.

If by chance a node A attempts to seize the communication medium at approximately the same time as a node B, this has the effect that each node will notice a collision. Each node then waits another random amount of time, sometimes referred to as a "back-off time", generally selected to be a multiple of the original waiting-time parameter. For example and without limitation, each of node A and node B might select a back-off time that is double the waiting-time parameter. If a second collision occurs, both node A and node B again wait a second-order back-off time, for example and without limitation, twice the first back-off time, until one of node A or node B is successful at seizing the communication medium.

If a node A finds the communication medium is busy when it would otherwise attempt to seize the communication medium, the node waits for the next opportunity. To provide fairness, a back-off timer is used. Each node selects a random waiting time within the range of the contention window. If the node doesn't get access to the medium in the first cycle, it stops the back-off timer and waits for the medium to be idle for the AIFS time. The timer is then restarted. The node will not choose another back-off time, but will continue counting down thus giving the deferred nodes an advantage over new joining nodes. When the communication medium is clear, traffic from the station is transmitted 116.

QoS classes described herein include voice (VO), video (VI), best efforts (BE), background (BK), and possibly other QoS classes. Operational parameters affecting a DCF (as described above) might include a maximum contention window time, an AIFS (automatic inter-frame spacing) a random back-off time, and possibly other parameters. AP's in a wireless communication system engage in setting parameters for each level of QoS in response to a measure of the degree of contention for that level of QoS and for those levels of QoS with higher priority. Data flows are processed in separate queues according to QoS indication and in response to that indication, appropriate operational parameters are set. This processing affects not only the parameters for the data flow under consideration but also for levels of QoS with lower priority. Parameters are also set based on the number of users for each QoS level. Data flows may operate bi-directionally, with the effect that operational parameters may be established for each device in response to its QoS and in response to its location in the system.

Determining Contention Parameters

Once all traffic on the channel has stopped, each AP 240 has an opportunity to send a message. VO (voice) QoS messages have highest priority, so for each particular AP 240, if there are any, it sends those messages first. Current IEEE 802.11 standards provide that there is a time delay after all traffic has stopped (AIFS) of at least 10 microseconds. After that 10 microsecond period, the AP 240 has the choice of waiting 1 or more time slots (each a designated amount of time, such as some number of microseconds) before sending a message. This has the effect that if the AP 240 waits, another AP 240 with a higher-priority message will be able to send its message first. Current IEEE 802.11 standards provide that the AP 240 stochastically determines a further time delay (as described above), so that multiple APs 240 can avoid collisions if more than one of them attempts to each send a message substantially concurrently (e.g., within 1 time slot). If two APs 240 each send a message substantially concurrently, those messages will collide, with the effect that recipients will not be able to determine what was sent. In case of a collision, each AP 240 whose message collided conducts a "back-off" for a stochastically determined amount of time. The back-off parameter is sometimes referred to as $[C_w]$, which refers to an exponentially growing amount of time for back-off after each collision. In effect the AP 240 waits a random (or pseudorandom) amount of time between 0 and $[2^{C_w}-1]$ time slots before sending its message. Each AP 240 that wants to send a message over a channel must contend with other APs 240 on the channel.

In a system where there are [m] contenders for sending messages, the average number of contenders for each time slot will asymptotically approach [2−1/m]. In response to this, an "ideal" back-off would be [2n+k] time slots, where [n=2−1/m] where [n] represents a measure of the instantaneous number of contenders, and [k] represents a measure of the size of a typical message packet. In one embodiment, an 802.11 VoIP packet is typically 236 bytes, including headers added at the link layer, the network layer, and the transport layer, and there are typically 50 such packets per second. It appears superior to set the back-off parameter to account for a number of contenders at about 1 standard deviation above average. By way of example, the AP 240 sets its $[C_w]$ to [an+b], where [a] equals about 0.2 (as a conservative choice), and [b] equals a parameter $[C_{w\ min}]$. In one such embodiment, $[C_{w\ min}]$ equals 2 (that is, $[2^2=4]$) time slots. The AP 240 sets its parameters in response to whether there is any substantial VO (voice) traffic recently. If there is no such voice traffic, the AP 240 sets $[C_{w\ min}=2]$, $[C_{w\ max}=4]$, and [AIFS=1], the same as if only one call were present. If there is such voice traffic, the AP 240 sets $[C_{w\ min}]$ to a value found in a lookup table based on the number of VoIP calls, as described below, $[C_{w\ max}=C_{w\ min}+2]$, and [AIFS=1]. With AIFS equal to 1 time slot, other APs 240 with voice traffic can assure that they will be first by choosing 0 time slots of delay. These parameters might be distributed to each device associated with that traffic. Further, in the event of a hand-off of a wireless device from a first AP 240 to a second AP 240, the most effective parameters might also be handed off along with the device, either directly, or indirectly through the use of an intermediary controller.

VOIP Call Traffic

In one embodiment, voice traffic may be processed using a three part process:

For example and without limitation, in the context of the invention, there is no particular requirement for the flow labels, method steps, flow of control, or operations, to occur in the order they are coupled or otherwise shown in the figures, or in the order they are described in the text.

$1^{st}$, Adjust contention parameters for VO (voice) traffic to reduce collisions for voice packet transmissions at the active AP 240.

$2^{nd}$, Adjust contention parameters for BE (best efforts) traffic such that voice traffic always gets higher priority at the active AP 240.

$3^{rd}$, Adjust contention parameters for VO (voice) traffic at neighboring AP's 240 (of each active AP 240) sharing a communication channel, and thus having the prospect of being an interfering AP 240. This has the effect of providing better voice quality in dense wireless LAN deployments where active AP's 240 and neighboring AP's 240, or wireless devices 230 associated with those active AP's 240 and neighboring AP's 240, might interfere with each other.

This process might be performed by determining the contention window parameters for voice in response to a number of VOIP calls, or other voice traffic requests, both for the active AP 240 and its neighboring AP's 240, and determining a set of contention parameters for BE (best efforts) in response to a set of contention parameters for voice and a measure of contention (such as for example a number of contenders) for BE traffic, as described below.

One or more control elements 250 might identify the setup of VOIP calls in response to call establishment packets. Such call establishment packets are generally exchanged using well known protocols such as SIP, H.323 and SCCP. The control elements 250 might determine when VOIP calls are being setup in response to rule-based inference performed with respect to those call establishment packets.

When a VOIP call is setup, an active AP 240 associated with the new VOIP call informs, both one or more control elements 250 and any other AP's 240 associated with that VOIP call, of wireless devices 230 associated with that VOIP call. Similarly, when a VOIP call is ended, an active AP 240 associated with the new VOIP call informs, both one or more control elements 250 and any other AP's 240 formerly associated with that VOIP call, of wireless devices 230 formerly associated with that VOIP call. This has the effect that the control elements 250 and other AP's 240 can determine a number of active VOIP calls, such as a number of active VOIP calls for each AP's 240 nearby wireless devices 230 and neighboring AP's 240.

In one embodiment, each AP 240 advertises its determined number of VOIP calls in beacon messages. Each AP 240 can determine a number of VOIP calls in its nearby region in response to a total of the number of VOIP calls advertised in such beacon messages. Moreover, each AP 240 can determine a number of VOIP calls in its nearby region in response to information from one or more control elements 250.

Contention Parameters for Voice

In one embodiment, AP's 240 might determine at least some of their contention parameters; in alternative embodiments, one or more control elements 250 might determine at least some of the AP's 240 contention parameters and provide them to the AP 240. Similarly, in one embodiment, wireless devices 230 might determine at least some of their contention parameters; in alternative embodiments, one or more AP's 240 (such as the wireless device's 230 servicing AP 240) or control elements 250 might determine at least some of the wireless device's 230 contention parameters and provide them to the wireless device 230.

In one embodiment, a $1^{st}$ set of contention parameter values might be used by AP's 240 for message elements 220 sent by that AP 240, while a $2^{nd}$ set of contention parameter values might be used by wireless devices 230 serviced by or otherwise associated with that AP 240. The AP 240 send those $2^{nd}$ contention parameter values to those wireless devices 230 it services in beacon messages; wireless devices 230 receive those $2^{nd}$ contention parameter values and use them when they send message elements 220 to their AP's 240.

In one embodiment, the parameter $[C_{w\ min}]$ might be determined in response to a lookup table, in response to a number of VOIP calls, or other voice traffic requests. Either a single lookup table might be used for substantially all AP's 240, or multiple lookup tables might be used for distinction between the active AP 240 and its neighboring AP's 240. $[C_{w\ max}]$ is computed in response to $[C_{w\ min}]$. For example and without limitation, the following table might be used for $[C_{w\ min}]$.

| Number of Calls | $C_{w\ min}$ for AP | $C_{w\ min}$ for Wireless Device |
|---|---|---|
| 0-5 | 2 | 3 |
| 6-15 | 2 | 4 |
| 16-27 | 3 | 5 |
| >27 | 3 | 6 |

In one embodiment, the parameter $[C_{w\ max}]$ is set to $[C_{w\ min}+2]$. Other parameters such as the arbitration inter-frame space number (AIFSN) may also be set for optimization. For example and without limitation the AIFSN for voice may be set to 1 for APs 240 and the AIFSN for best effort may be set to 2 for wireless devices 230.

Contention Parameters for Video

In one embodiment, VI (video) operation parameters are set and processed at a lower priority than VO (voice) operation parameters. The active AP 240 sets its parameters for video traffic in response to whether there has been any recent video or voice traffic. If there is no video traffic, the AP 240 sets $[C_{w\ min\ VI}=C_{w\ min\ VO}+2]$, $[C_{w\ max\ VI}=C_{w\ min\ VI}+2]$, and $[AIFS_{VI}=4]$.

If there is substantial video traffic, the AP 240 sets $[AIFS_{VI}=AIFS_{VO}+C_{w\ min\ VO}]$, $[C_{w\ min\ VO}=0.4n+3]$, and $[C_{w\ max\ VO}=C_{w\ min\ VO}+2]$.

This has the effect of creating video traffic contention parameter values in response to voice traffic contention parameter values.

Contention Parameters for Best Efforts

Once voice and video parameters are set (as described above), the active AP 240 sets its parameters for BE (best efforts) traffic if there has been any substantial recent best efforts mode traffic. Otherwise, If there is no such best efforts traffic, the AP 240 sets $[AIFS_{BE}=0]$, $[C_{w\ min\ BE}=0]$, and $[C_{w\ max\ BE}=0]$.

If there is such best efforts traffic, the AP 240 sets [$AIFS_{BE} = AIFS_{VI} + C_{w\ min\ VI}$], [$C_{w\ min\ BE} = \min(0.5n+1, 10)$], and [$C_{w\ max\ BE} = C_{w\ min\ BE} + 2$].

In alternative embodiments, if there are any VOIP calls, the BE values may be updated to set as [$AIFS_{BE} = 7$] if [$C_{w\ min\ voice} < 4$], otherwise 15. These values are for example only and are not intended to be limiting in any way. For best effort quality the AIFS parameter value is preferably kept sufficiently high so that even with a relatively small random backoff chosen, BE traffic has a larger backoff than for voice. For example and without limitation, if [$C_{w\ min\ BE} < C_{w\ min\ voice} + 2$],

[$C_{w\ min\ BE}$] is increased to [$C_{w\ min\ VO} + 2$] and [$C_{w\ max\ BE} = C_{w\ min\ BE} + 2$].

Contention Parameters for Background

Similarly, the active AP 240 sets its parameters for background traffic which is usually lower-priority data transfers. The active AP 240 sets [$C_{w\ min\ BK}$], [$C_{w\ max\ BK}$], and [$AIFS_{BK}$] to values which are relatively large compared to corresponding parameters for relatively higher-priority traffic. For example, the parameter values may be set in response to parameters for higher priority traffic.

FIG. 2

Figure 2:
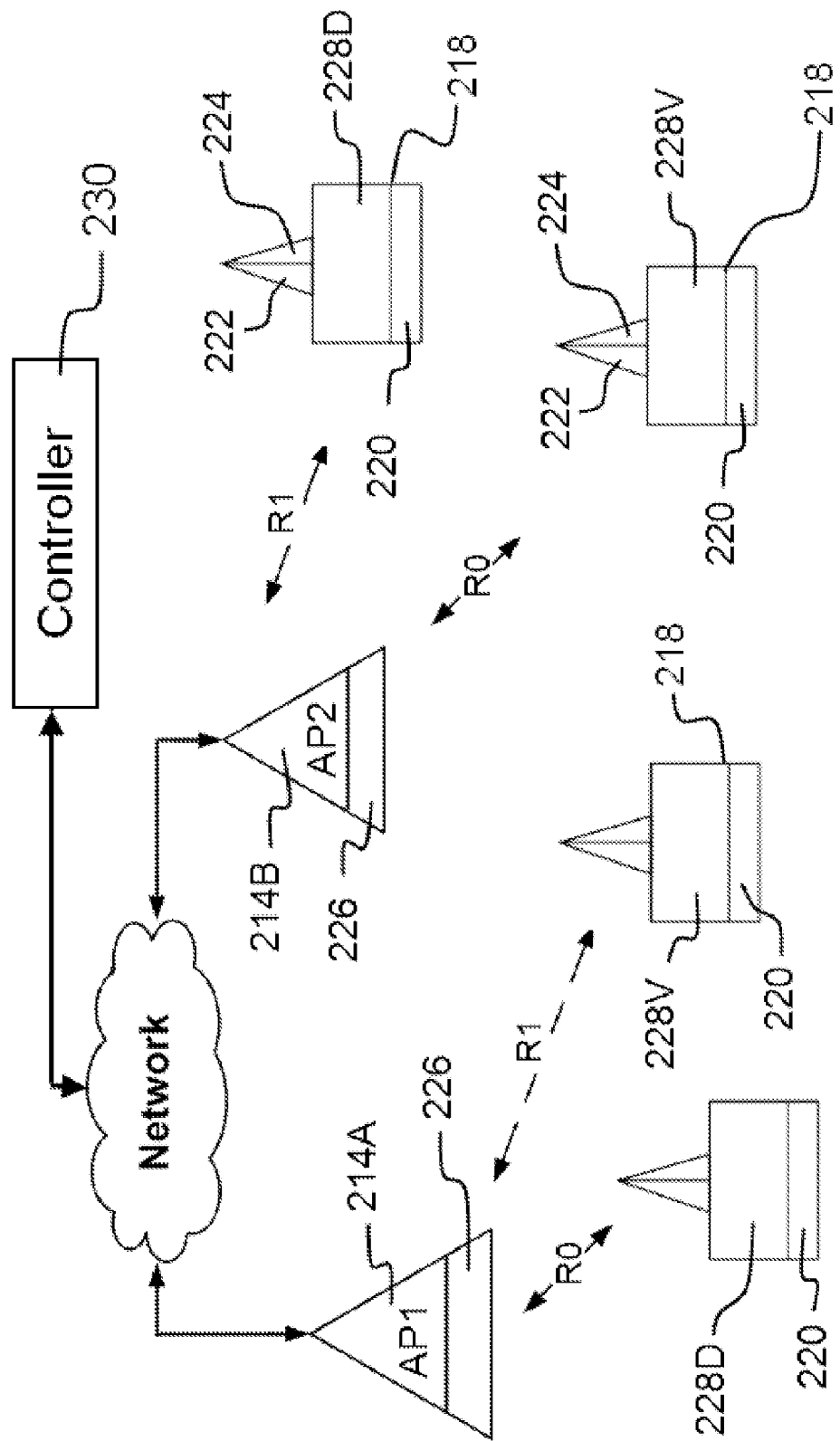
FIG. 2 shows a conceptual drawing of a system.

FIG. 2 shows a conceptual drawing of a system 200, including elements shown in the figure, including one or more wireless communication channels 210 (shown conceptually), a set of message elements 220 (shown conceptually) capable of being sent or received, a set of wireless devices 230 (sometimes referred to herein as "mobile stations" or "wireless stations"), one or more AP's 240, and one or more control elements 250.

The message elements 220 are capable of being sent or received by wireless devices 230, AP's 240, or control elements 250.

In one embodiment, the wireless devices 230 communicate with the AP's 240, while the AP's 240 communicate with each other and with the control elements 250, as described in other and further detail in the Incorporated Disclosures. While this application primarily relates to systems 200 which perform wireless communication according to those methods or techniques described in the Incorporated Disclosures, in the context of the invention, there is no particular reason for any such limitation. For example and without limitation, the system 200 might perform wireless communication or other communication in accordance with other methods or techniques, not all of which are further described herein.

The AP's 240 include elements shown in the figure, including at least one or more AP control elements 241 and one or more AP transceivers 242. The AP control elements 241 include one or more computing devices, such as for example including one or more processors, and memory and mass storage disposed to maintain or have access to data and instructions. Such data and instructions might include one or more software elements, possibly including operating system software and application software.

In one embodiment, the AP control elements 241 cooperate with the control elements 250 as described in the Incorporated Disclosures.

In one embodiment, the AP transceivers 242 each include an EMF (electromagnetic frequency) transmitter and receiver, such as an RF (radio frequency) transmitter and receiver, including one or more antennas.

In one embodiment, each AP 240 serves those wireless devices 230 within a 1$^{st}$ range 243, such as for example a range for which those wireless devices 230 are capable of receiving message elements 220 from the AP 240, and for which the AP 240 is capable of receiving message elements 220 from the wireless devices 230, with a relatively reasonable measure of reliability. The AP's 240 cooperate with the control elements 250, as described as described in the Incorporated Disclosures, with the effect that those wireless devices 230 which enter that 1$^{st}$ range 243 of an AP 240 are transferred to being serviced by that AP 240, and those wireless devices 230 which exit that 1$^{st}$ range 243 of an AP 240 are transferred to being serviced by a different AP 240.

It might occur that one or more interfering wireless devices 230, or interfering AP's 240, are present within a 2$^{nd}$ range 244 of one or more active AP's 240, such as for example a range for which those wireless devices 230 are best suited for service by one or more interfering AP's 240 (herein sometimes called "nearby" AP's 240), but for which message elements 220 sent by those interfering wireless devices 230 or interfering AP's 240 are sufficiently disruptive of communication with those active AP's 240 that those active AP's 240 cannot reliably send or receive message elements 220 concurrently therewith. In such cases, this has the effect that communication bandwidth for those active AP's 240 is substantially curtailed while those interfering wireless devices 230 are sending message elements 220.

This has the effect that those active AP's 240, and those wireless devices 230 serviced by them, contend for communication bandwidth with those interfering wireless devices 230 and those interfering AP's 240.

The active AP's 240 determine contention parameters in response to both those wireless devices 230 they service, and in response to those interfering wireless devices 230 and those interfering AP's 240.

The active AP's 240 determine and set contention parameters for VO (voice) traffic in response to a number of VOIP calls, or other VO requests, by both those wireless devices 230 they service, and those interfering wireless devices 230 and those interfering AP's 240. This has the effect that the active AP's 240 determine and set contention parameters for VO traffic in response to an amount of contention those active AP's 240 encounter for VO traffic.

The active AP's 240 also determine and set contention parameters for BE (best efforts) traffic (herein sometimes referred to as data traffic, or by similar phrases or terms), both in response to (1) those VO contention parameters they determined and set, and in response to (2) an amount of contention for BE traffic by both those wireless devices 230 they service, and those interfering wireless devices 230 and those interfering AP's 240. This has the effect that the active AP's 240 determine and set contention parameters for BE traffic in response to an amount of contention those active AP's 240 encounter, both for VO traffic, and for BE traffic.

Contention parameters include, for example and without limitation, an AIFS time 110, a minimum contention window time 114, and a maximum contention window time 114 (such as for example, as those parameters are described above). This has the effect of reducing a relative number of collisions, back-offs, and retries, reducing packet loss and communication delay, even when the possibility of VOIP call traffic contention is due, not to contention at the active AP 240, but to contention with AP's 240 or wireless devices within near communication range, also sometimes referred to herein as "interfering" wireless devices 230 or "interfering" AP's 240.

Wireless devices 230 also determine contention parameters (or alternatively, receive and use contention parameters as set by their servicing AP 240) in response to both those wireless devices 230 serviced by their servicing AP 240, and in response to those interfering wireless devices 230 and those interfering AP's 240.

Wireless devices 230 determine and set contention parameters (or alternatively, receive and use contention parameters as set by their servicing AP 240) for VO (voice) traffic in response to a number of VOIP calls, or other VO requests, by both those wireless devices 230 associated with their servicing AP 240, and those interfering wireless devices 230 and those interfering AP's 240. This has the effect that wireless devices 230 determine and set (or alternatively, receive and use contention parameters as set by their servicing AP 240) contention parameters for VO traffic in response to an amount of contention those active AP's 240 encounter for VO traffic.

Wireless devices 230 also determine and set contention parameters (or alternatively, receive and use contention parameters as set by their servicing AP 240) for BE (best efforts) traffic (herein sometimes referred to as data traffic, or by similar phrases or terms), both in response to (1) those VO contention parameters they use, and in response to (2) an amount of contention for BE traffic by both those wireless devices 230 associated with their servicing AP 240, and those interfering wireless devices 230 and those interfering AP's 240. This has the effect that wireless devices 230 determine and set contention parameters (or alternatively, receive and use contention parameters as set by their servicing AP 240) for BE traffic in response to an amount of contention those active AP's 240 encounter, both for VO traffic, and for BE traffic.

Contention parameters both for wireless devices 230 and for AP's 240 might be coordinated among multiple AP's 240, or among both multiple AP's 240 and their associated wireless devices 230, under the direction of, or with the cooperation of, one or more control elements 250.

FIG. 3

Figure 3:
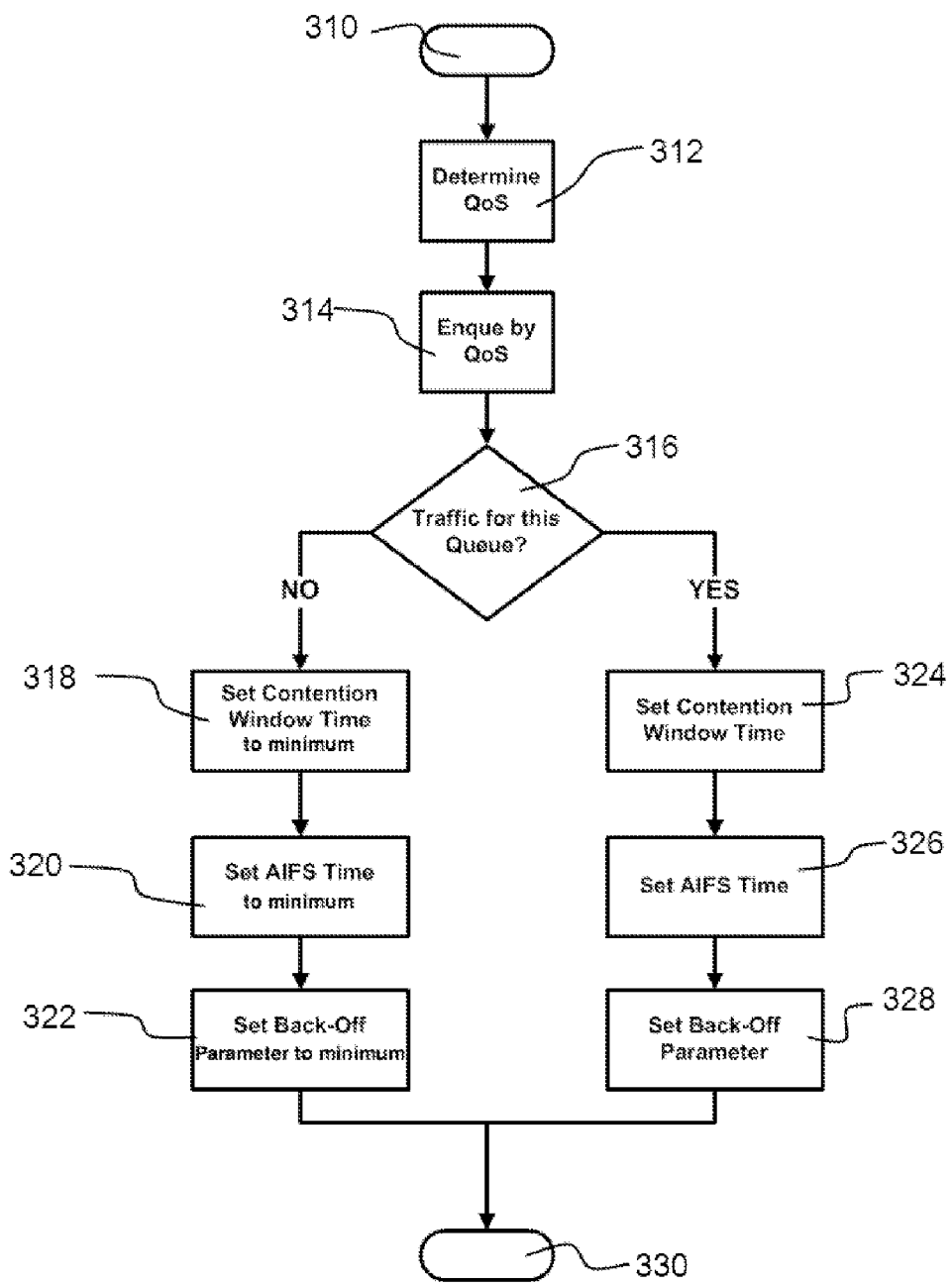
FIG. 3 shows a conceptual drawing of a method.

FIG. 3 shows a conceptual drawing of a method 300, including flow labels and method steps as shown in the figure.

As described herein, the method steps are shown in the figure and described in a linear order. However, in the context of the invention, there is no particular requirement that the flow labels or method steps are encountered or performed linearly, in any particular order, or by any particular device. For example and without limitation, the flow labels and method steps might be encountered or performed in parallel, in a pipelined manner, by a single device or by multiple devices, by a general-purpose processor or by a special-purpose processor (or other special-purpose circuitry disposed for carrying out part or all of the method 300), by one or more processes or threads, at one or more locations, and in general, using any one or more of the techniques known in the many arts of computing science.

Beginning of Method

Reaching a flow label 300A indicates a beginning of the method 300.

At a step 301, the method 300 is triggered and begins operation. In various embodiments, the method 300 might be triggered by any circumstance in which it is desirable to perform one or more tests of the system 100, such as for example, one or more of the following.

For example and without limitation, the method 300 might begin with reception of a data flow.

While this description is at least partially directed to embodiments with respect to specific techniques for triggering the method 300, such as in this step, in the context of the invention, there is no particular requirement for any such limitation. The method 300 might be triggered, such as in this step, by any technique suitable for triggering a computation, method, or process.

The method 300 proceeds with the step 312.

Determining QoS and Parameters

At a step 312, the method 300 determines a QoS (quality of service). In cases in which the method 300 operates on data flows, the QoS is associated with one or more data flows. For example and without limitation, QoS might include "VO" (voice), "VI" (video), "BE" (best efforts) or "BK" (background). Other QoS parameters are also possible. In the context of the invention, there is no particular requirement for any given set of QoS parameters.

At a step 314, the method 300 queues data flows (or individual messages, or individual message units) in response to their associated QoS. This has the effect of allowing separate processing for distinct QoS.

At a step 316, the method 300 polls each queue, to determine whether there is traffic volume for that associated QoS. For a first example and without limitation, the method 300 might transmit a message unit in response to any queue that is not empty. For a second example and without limitation, the method 300 might transmit a message unit in response to any queue that has sufficient queues data flows, messages, or message units, that the method 300 determines that transmitting a message unit is justified. While there is no particular distinction made herein between transmit criteria for distinct queues, in the context of the invention, there is no particular reason for any such limitation. For example and without limitation, the method 300 might determine that it is justified in transmitting a message unit in response to differing criteria for distinct queues.

If, at the step 316, a queue associated with a particular QoS does *not* have sufficient traffic volume to justify transmitting a message unit, selected parameters are set to so indicate. For example and without limitation, the contention parameters might be set to zero.

At a step 318, a contention window time for that queue is set to zero.

At a step 320, an AIFS time for that queue is set to zero.

At a step 322, a back-off parameter for that queue is set to zero.

At a step 324, a contention window time for that queue is set (as described above).

At a step 326, an AIFS time for that queue is set (as described above).

At a step 328, a back-off parameter for that queue is set (as described above).

The method 300 proceeds with the flow label 300B.

End of Method

Reaching a flow label 300B indicates an end of the method 300.

In one embodiment, the method 300 might be repeated indefinitely so long as the device performing the method 300 (e.g., an AP 240 or other node) is operational.

As seen above with respect to the method 300, the AP 240 (or other node) processes data flows, messages, and message units in response to a type of traffic (thus, a QoS) associated with that message traffic. For example and without limitation, each QoS level has its parameters dynamically and independently set for its particular type of traffic (as described above).

This has the effect of providing for substantially optimal handling for each associated QoS, e.g., by varying parameters of a distributed coordination function associated with that particular QoS (as described above). For example and without limitation, services where delays substantially degrade performance can be processed to reduce delays, while services where loss of data is more critical than latency can be serviced with a lower priority but with a greater attention to guaranteed delivery of data. For example and without limitation, such techniques include setting parameters for each level of QoS in response to a measure of the degree of contention for that level of QoS, and in response to a measure of the degree of contention for other levels of QoS with higher priority (as described above). This has the effect that changes in contention at each level of QoS affect the waiting time parameters, not only for that level of QoS, but also for levels of QoS with lower priority (as described above).

For example and without limitation, such techniques include setting waiting time parameters in response to a stochastic model of contention at each level of QoS (as described above). Such techniques might be operable in a system in which message units are received at a node in a wireless communication network, such as an AP 240 (as described above).

ALTERNATIVE EMBODIMENTS

The invention has applicability and generality to other aspects of wireless communication systems management.

The invention claimed is:

1. A computer-implemented method in an access point of a wireless communication system for optimizing QoS (Quality of Service) for each type of traffic at the access point, the method comprising the steps of:
   determining a type for traffic received at the access point, and a number of VOIP (Voice Over Internet Protocol) calls;
   queuing the traffic at the access point responsive to the type of traffic;
   receiving measurements for each type of external traffic heard at the access point, the traffic associated with at least one external access point and at least one a wireless device, and including a number of external VOIP calls;
   determining one or more contention parameters responsive to the measurements for each type of external traffic including the number of VOIP calls at the access point and the number of external VOIP calls at the at least one external access point having the prospect of causing interference to the access point, and a quality of service associated with the type of traffic;
   contending for communication bandwidth for each type of traffic in response to the one or more contention parameters; and
   handing-off a wireless device serviced by the access point to an external access point for subsequent service, wherein at least a portion of contention parameters are sent to the external access point during the hand-off;
   wherein a control element that is in communication with and manages both the access point and the external access point, directs the hand-off from the access point to the external access point, and passes the contention parameters from the access point to the external access point; and
   wherein the one or more contention parameters comprise one or more of: an AIFS (automatic inter-frame spacing), minimum contention window, and maximum contention window.

2. The method of claim 1, wherein determining the one or more contention parameters is at least partially directed by the control element with, communication among, and management responsibility for, the access point and the at least one external access point.

3. The method of claim 1, wherein the one or more contention parameters are based at least in part on a type of node being an access point rather than a station.

4. The method of claim 1, wherein the quality of service associated with the type of traffic comprises one or more of: VO (voice), VI (video), BE (best efforts), and BK (background).

5. The method of claim 1,
   wherein: the access point and the one or more external access points inform the control element that a VOIP call is in progress.

6. The method of claim 1, wherein: the access point and the one or more external access points inform the control element that a VOIP call is in progress, and determining the one or more contention parameters comprises receiving a number of active VOIP calls from the control element and determining the one or more contention parameters at least partially based on the number of VOIP calls.

7. The method of claim 1,
   wherein: the access point and the one or more external access points inform the control element that a VOIP call is in progress, and determining the one or more contention parameters comprises receiving a number of active VOIP calls from the control element and determining the one or more contention parameters at least partially based on the control element tracking the number of VOIP calls by identifying call set-ups from call establishment packets, and sending the number of VOIP calls to the access point.

8. The method of claim 1, further comprising:
   advertising a number of VOIP calls by the access point and the external access points in beacon messages, wherein determining the one or more contention parameters is at least partially based on the number of VOIP calls in progress.

9. A non-transitory computer-readable medium storing instructions that, when executed by a processor in an access point of a wireless communication system, perform a method for optimizing QoS (Quality of Service) for each type of traffic at the access point, the method comprising the steps of:
   determining a type for traffic received at the access point, and a number of VOIP (Voice Over Internet Protocol) calls;
   queuing the traffic at the access point responsive to the type of traffic;
   receiving measurements for each type of external traffic heard at the access point, the traffic associated with at least one external access point and at least one a wireless device, and including a number of external VOIP calls;
   determining one or more contention parameters responsive to the measurements for each type of external traffic including the number of VOIP calls at the access point and the number of external VOIP calls at the at least one external access point having the prospect of causing interference to the access point, and a quality of service associated with the type of traffic; contending for communication bandwidth for each type of traffic in response to the one or more contention parameters; and
   handing-off a wireless device serviced by the access point to an external access point for subsequent service, wherein at least a portion of contention parameters are sent to the external access point during the hand-off;

wherein a control element that is in communication with and manages both the access point and the external access point, directs the hand-off from the access point to the external access point, and passes the contention parameters from the access point to the external access point; and wherein the one or more contention parameters comprise one or more of: an AIFS (automatic inter-frame spacing), minimum contention window, and maximum contention window.

10. A network device of a wireless communication system for optimizing QoS (Quality of Service) for each type of traffic at the access point, comprising:
   a processor; and
   a memory, storing:
   a first module to determine a type for traffic received at an access point, including a number of VOIP (Voice Over Internet Protocol) calls;
   a second module to queue the traffic at the access point responsive to the type of traffic;
   a third module to receive measurements for each type of external traffic heard at the access point, the traffic associated with at least one external access point and at least one a wireless device, and including a number of external VOIP calls;
   a fourth module to determine one or more contention parameters responsive to the measurements for each type of external traffic including the number of VOIP calls at the access point and the number of external VOIP calls at the at least one external access point having the prospect of causing interference to the access point, and a quality of service associated with the type of traffic;
   a fifth module to contend for communication bandwidth for each type of traffic in response to the one or more contention parameters; and
   a sixth module to hand-off a wireless device serviced by the access point to an external access point for subsequent service, wherein at least a portion of contention parameters are sent to the external access point during the hand-off; and
   a seventh module wherein a control element that is in communication with and manages both the access point and the external access point, directs the hand-off from the access point to the external access point, and passes the contention parameters from the access point to the external access point; and
wherein the one or more contention parameters comprise one or more of: an AIFS (automatic inter-frame spacing), minimum contention window, and maximum contention window.

* * * * *